(12) United States Patent
Lu et al.

(10) Patent No.: US 8,081,278 B2
(45) Date of Patent: Dec. 20, 2011

(54) MULTIDOMAIN-VERTICAL-ALIGNMENT TRANSREFLECTIVE LCD

(75) Inventors: Ying-Chi Lu, Hsin-Chu (TW);
Ching-Sheng Cheng, Hsin-Chu (TW);
Chih-Jen Hu, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 273 days.

(21) Appl. No.: 12/497,790

(22) Filed: Jul. 6, 2009

(65) Prior Publication Data
US 2010/0007826 A1   Jan. 14, 2010

(30) Foreign Application Priority Data
Jul. 11, 2008   (TW) ................. 97126452 A

(51) Int. Cl.
*G02F 1/1335* (2006.01)
*G02F 1/1337* (2006.01)
(52) U.S. Cl. ......... 349/114; 349/106; 349/122; 349/129
(58) Field of Classification Search .............. 345/87, 345/88; 349/106, 113, 114, 122, 128, 129
See application file for complete search history.

(56) References Cited

U.S. PATENT DOCUMENTS
| | | |
|---|---|---|
| 7,177,000 B2 | 2/2007 | Hu et al. |
| 7,580,094 B2 | 8/2009 | Wang et al. |
| 2002/0113927 A1 * | 8/2002 | Ha et al. .......................... 349/113 |
| 2005/0088597 A1 | 4/2005 | Maeda et al. |
| 2005/0122452 A1 * | 6/2005 | Yoshida et al. ............... 349/114 |
| 2005/0185120 A1 | 8/2005 | Kitoh et al. |
| 2006/0238673 A1 | 10/2006 | Roh |
| 2009/0002611 A1 | 1/2009 | Jiang et al. |

FOREIGN PATENT DOCUMENTS
| | | |
|---|---|---|
| CN | 1651986 | 8/2005 |
| CN | 101067706 | 11/2007 |
| CN | 101149512 | 3/2008 |
| TW | I259587 | 8/2006 |
| TW | I269074 | 12/2006 |

OTHER PUBLICATIONS

English language translation of abstract of I259587.
English language translation of abstract of I269074.
English language translation of abstract and pertinent parts of CN 101067706. (Published Nov. 7, 2007).
English language translation of abstract and pertinent parts of CN 1651986. (Published Aug. 10, 2005).
English language translation of abstract and pertinent parts of CN 101149512.(Published Mar. 26, 2008).

* cited by examiner

*Primary Examiner* — David Nelms
*Assistant Examiner* — Tai Duong
(74) *Attorney, Agent, or Firm* — Thomas, Kayden, Horstemeyer & Risley, LLP

(57) ABSTRACT

A transreflective LCD has a TFT array plate, a color filter plate and a liquid crystal therebetween. A trench is in the overcoat layer of the TFT array plate and/or the color filter plate. The trench can be located in a transmission area or in a reflective area of a pixel. A conformal transparent electrode is located therein, and an overcoat material is filled up in the trench.

16 Claims, 17 Drawing Sheets

MULTIDOMAIN-VERTICAL-ALIGNMENT TRANSREFLECTIVE LCD

RELATED APPLICATIONS

This application claims priority to Taiwan Application Serial Number 97126452, filed Jul. 11, 2008, which is herein incorporated by reference.

BACKGROUND

1. Field of Invention

The present invention relates to a liquid crystal display (LCD). More particularly, the present invention relates to a transreflective LCD.

2. Description of Related Art

Since multi-domain vertical alignment (MVA) LCD has advantages of super wide view angle and high display quality, the MVA LCD draws lots of attractions from market. Conventional MVA LCD utilizes some protrusions or slits on the inner surfaces of two transparent substrates to deviate the alignment direction of liquid crystal molecules surrounding the protrusions or slits from the alignment direction of the liquid crystal molecules on planar surface, so that the view angle of LCD can be increased.

Although the protrusions of MVA LCD can increase the view angle thereof, the irregular alignment of the liquid crystal molecules surrounding the protrusions always create the problem of light leakage in the dark state and the contract ratio of the LCD is thus decreased.

SUMMARY

According to an aspect of this invention, a transreflective LCD is provided. A filled-up trench structure is provided to achieve the result of multi-domain vertical alignment and solve or improve the problem of light leakage in the dark state at the same time.

According to an embodiment of this invention, a transreflective LCD comprising a TFT array plate, a color filter plate, and a liquid crystal therebetween is provided. The color filter plate comprises a color filter layer on a substrate having a transmission area and a reflective area. An overcoat layer on the color filter layer and has a trench in the transmission area or the reflective area. The trench has a conformal transparent electrode and is filled by another overcoat layer.

According to another embodiment of this invention, a transreflective LCD comprising a TFT array plate, a color filter plate, and a liquid crystal therebetween is provided. The TFT array plate has a control circuit layer on a substrate having a transmission area and a reflective area. An overcoat layer on the control circuit layer and has a trench in the transmission area or the reflective area. The trench has a conformal transparent electrode and is filled by another overcoat layer.

Since the transparent electrode of the filled-up trench structure is conformal with the inner surface of the trench, the transparent electrode can twist the electrical field in the liquid crystal layer after applying a voltage on the transparent electrode to achieve the result of multi-domain vertical alignment. In addition, the trench is filled and has a planar surface, the alignment of the liquid crystal molecules can be more regular to solve the problem of light leakage in the dark state at the same time.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

According to embodiments of this invention, an overcoat layer is formed on a color filter plate or a TFT array plate. Then, a trench is formed in the overcoat layer. Next, after a conformal transparent conductive layer is formed on the inner surface of the trench, the trench is filled by a material of the overcoat layer to form a filled-up trench structure. The filled-up trench structure can effectively solve the problem of light leakage in the dark state.

I. Color Filter Plate

Figure 1A:
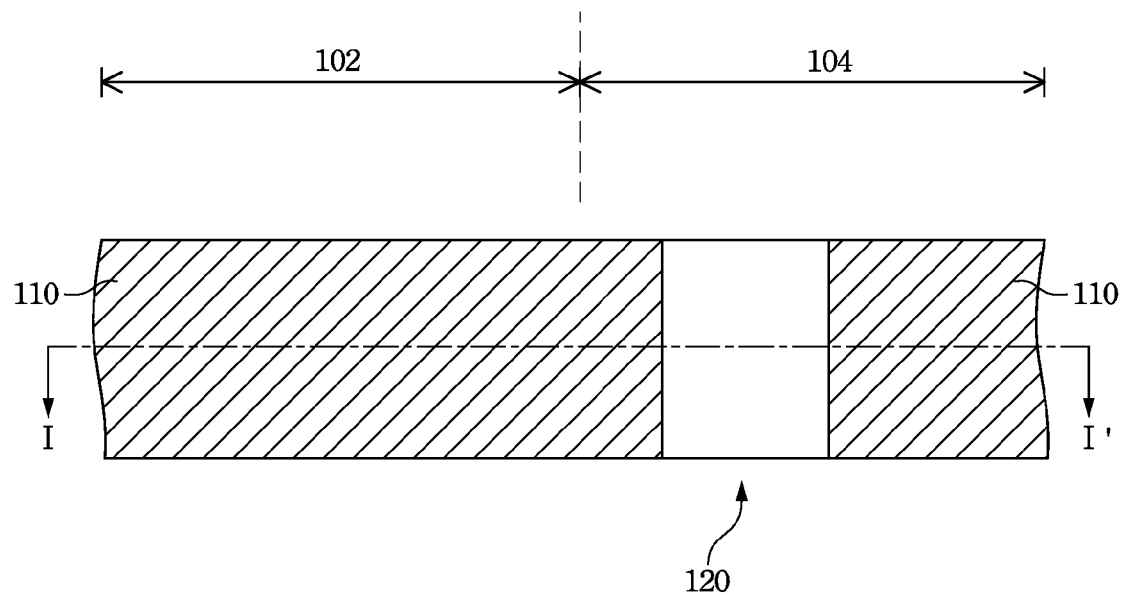
FIG. 1A is a vertical view cross-sectional diagram showing a color filter plate of a transreflective LCD.
Figure 1B:
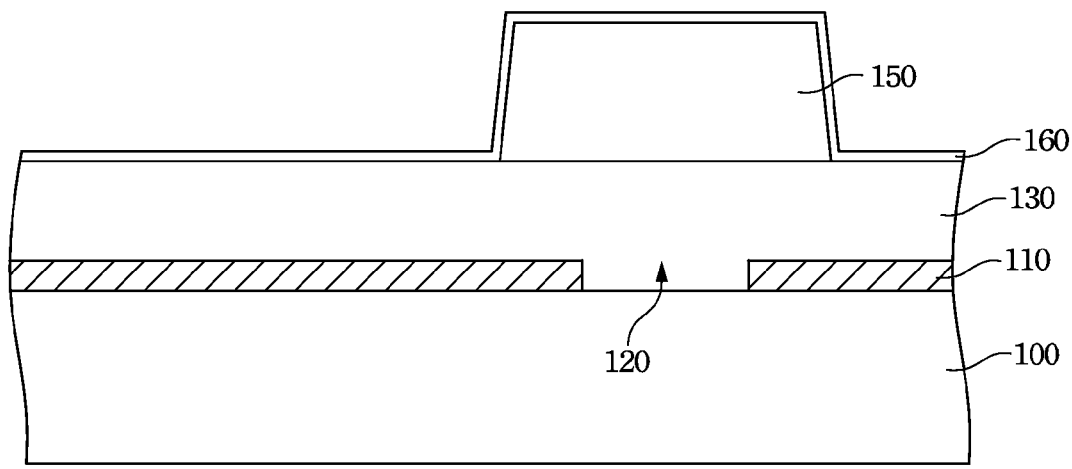
FIG. 1B is a cross-sectional diagram of cutting line I-I' in FIG. 1A.

FIG. 1A is a vertical view showing a color filter plate of a transreflective LCD, and FIG. 1B is a cross-sectional diagram of cutting line I-I' in FIG. 1A. FIGS. 1A and 1B show a pixel unit includes a transmission area 102 and a reflective area 104. In this pixel unit, a color filter layer 110 covers the transparent substrate 100 and has a light pervious opening 120 in the reflective area 104. A first overcoat layer 130, a second overcoat layer 150, and a transparent conductive layer 160 sequentially cover the color filter layer 110.

Filled-up trench structures on a color filter plate are illustrated in the following embodiments 1-3 to show how to achieve multi-domain vertical alignment and decrease the light leakage in the dark state due to irregular alignment of liquid crystal molecules.

Embodiment 1

Filled-up Trench Structure in Transmission Area

FIGS. 2A-2E are cross-sectional diagrams showing a method of fabricating a color filter plate of a transreflective LCD according to an embodiment of this invention.

Figure 2A:
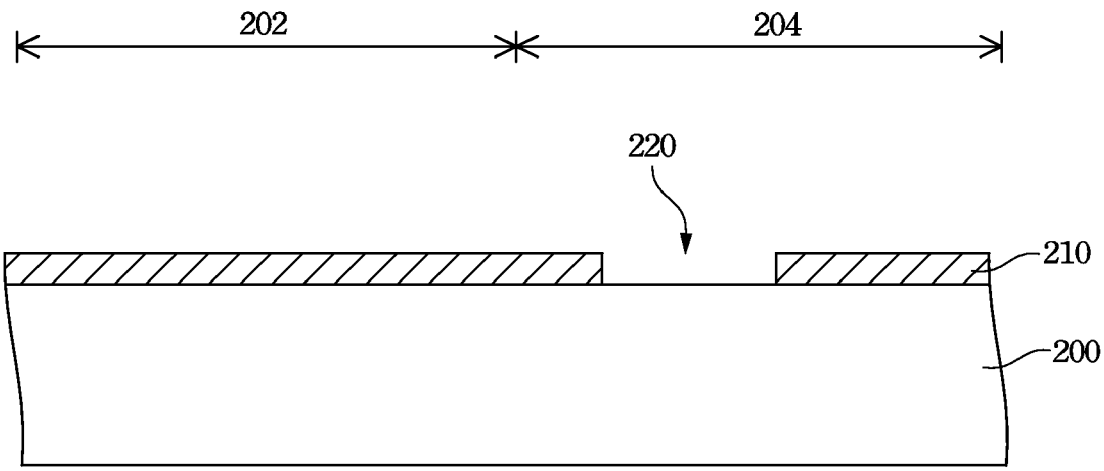
FIGS. 2A-2E are cross-sectional diagrams showing a method of fabricating a color filter plate of a transreflective LCD according to an embodiment of this invention.

In FIG. 2A, a substrate having a transmission area 202 and a reflective area 204 is provided. A color filter layer 210 is formed on the transparent substrate 200 and has a light pervious opening 220 in the reflective area 204. The light pervious opening 220 allows white light enter the LCD to increase the brightness of LCD.

Figure 2B:
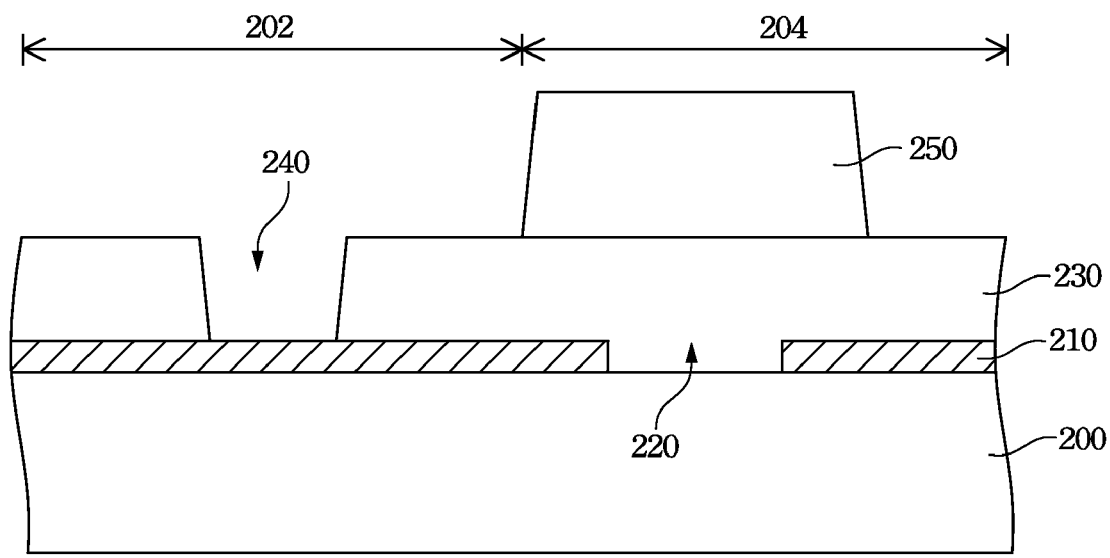

In FIG. 2B, a first overcoat layer 230 with a thickness of about 1-2 μm is formed on the transparent substrate 200. A trench 240 is then formed in the first overcoat layer 230 in the transmission area 202. The shape, viewed from top, of the trench 240 can be any shape, such as square or circle. Next, a second overcoat layer 250 with a thickness of about 1-2 μm is formed on the first overcoat layer 230 in the reflective area 204. The first overcoat layer 230 and the second overcoat layer 250 can be made by transparent organic or inorganic dielectric material.

Figure 2C:
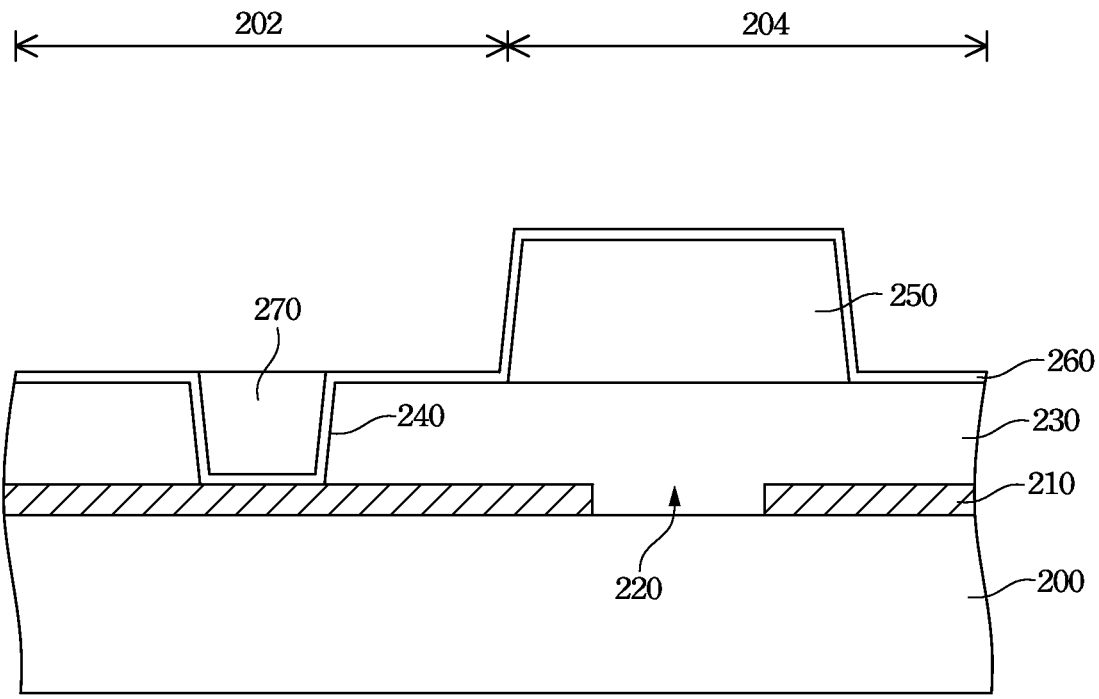

In FIG. 2C, a conformal transparent conductive layer 260 is formed on the first overcoat layer 230, the trench 240, and the second overcoat layer 250. A third overcoat layer 270 is then formed to fill the trench 240 to from a filled-up trench structure.

Figure 2D:
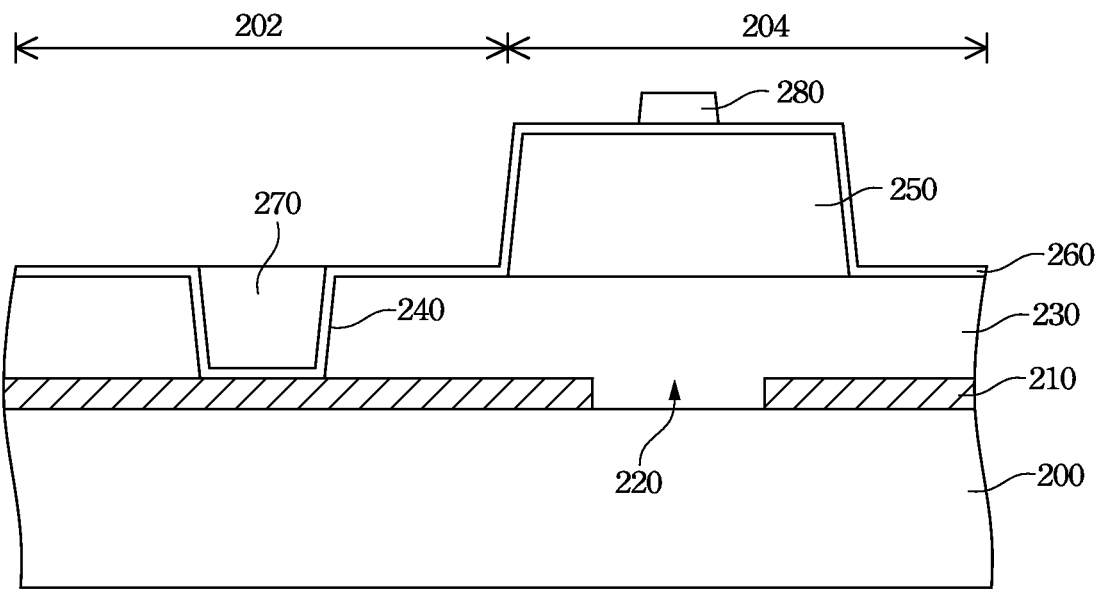
Figure 2E:
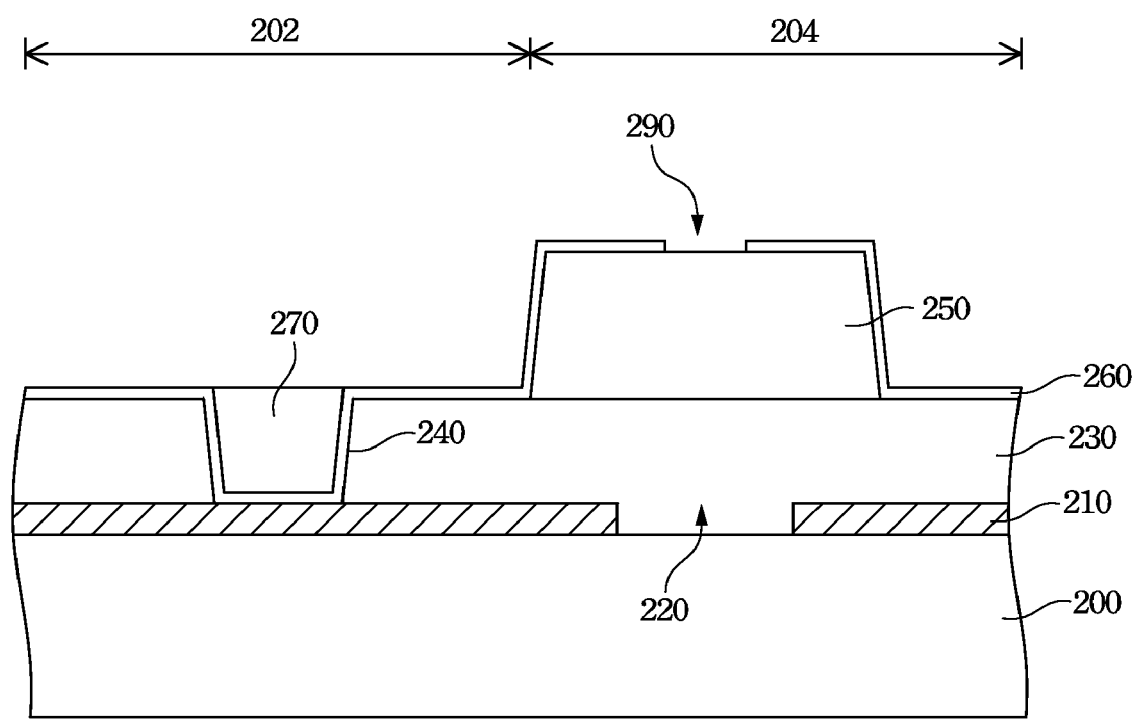

According to another embodiment of this invention, a protrusion can be additionally disposed in the reflective area to affect the alignment of liquid crystal molecules. In FIG. 2D, a fourth overcoat layer is formed on the second overcoat layer 250 to form a protrusion 280. The material of the protrusion 280 can be a transparent organic dielectric material, such as transparent photosensitive organic material PC403 of JSR Company.

According to another embodiment of this invention, a slit can be formed in the reflective area to decrease the problem of occurring disclination line. The transparent conductive layer 260 in FIG. 2C can be patterned to form slit 290 in the reflective area 204 in FIG. 2E.

Moreover, another light pervious opening (not shown in figure) can be further disposed in the first overcoat layer 230 of the above embodiments. The bottom of the light pervious opening in the first overcoat layer 230 touch the bottom of the light pervious opening 220 in the color filter layer 210. As a result, the light transmission rate of the light entering the LCD can be increased, since the light can directly entering the second overcoat layer 250 without the need of penetrating the first overcoat layer 230.

Embodiment 2

Filled-up Trench Structure in Reflective Area

FIGS. 3A-3E are cross-sectional diagrams showing a method of fabricating a color filter plate of a transreflective LCD according to an embodiment of this invention.

Figure 3A:
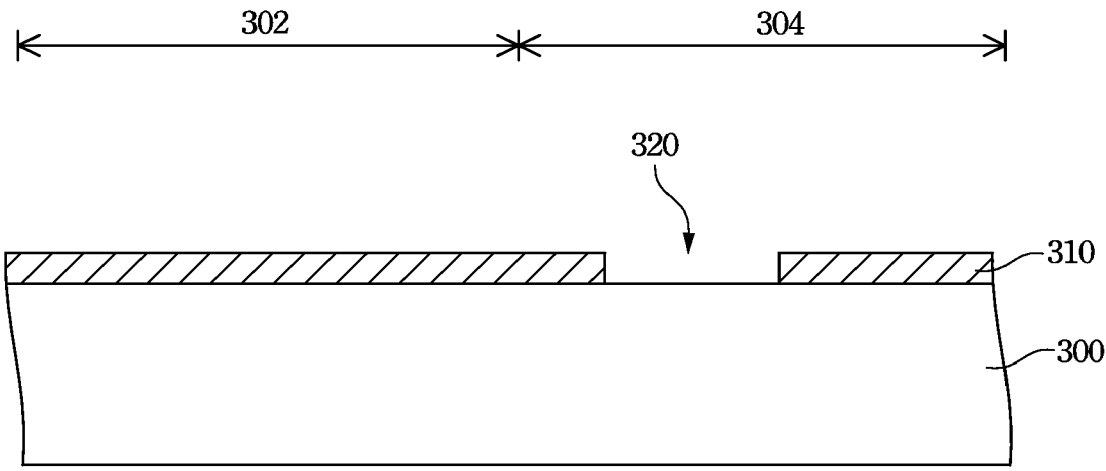
FIGS. 3A-3E are cross-sectional diagrams showing a method of fabricating a color filter plate of a transreflective LCD according to an embodiment of this invention.

In FIG. 3A, a substrate having a transmission area 302 and a reflective area 304 is provided. A color filter layer 310 is formed on the transparent substrate 300 and has a light previous opening 320 in the reflective area 304. The light pervious opening 320 allows white light enter the LCD to increase the brightness of LCD.

Figure 3B:
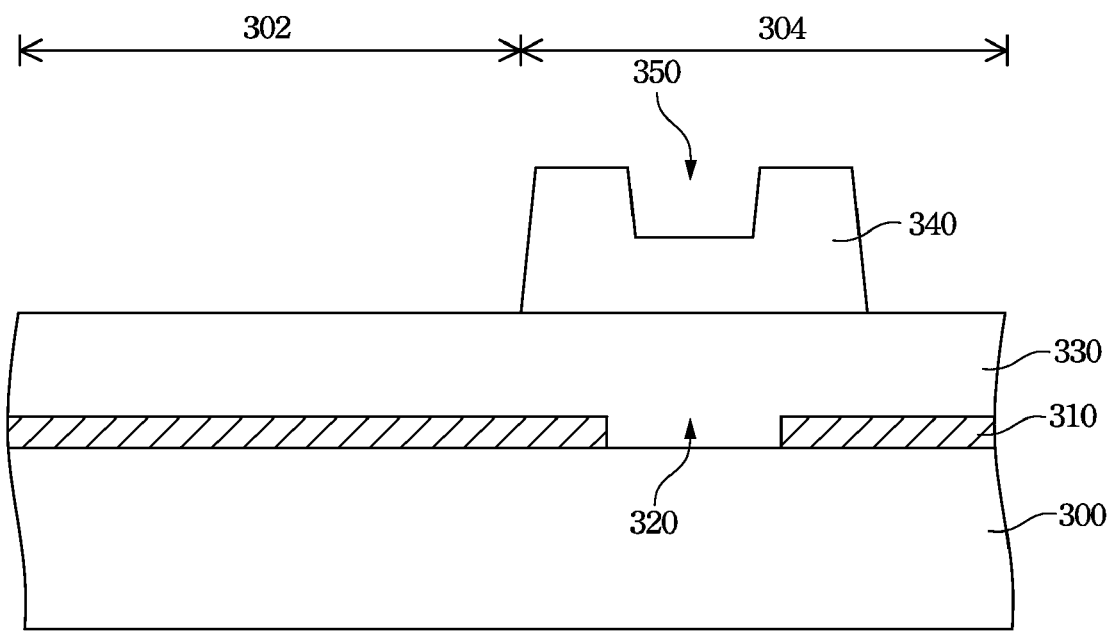

In FIG. 3B, a first overcoat layer 330 with a thickness of about 1-2 μm is formed on the transparent substrate 300. A second overcoat layer 340 with a thickness of about 1-2 μm is then formed on the first overcoat layer 330 in the reflective area 304. The second overcoat layer 340 has a trench 350, and a top view of the trench 350 can be any shapes, such as square or circle.

Figure 3C:
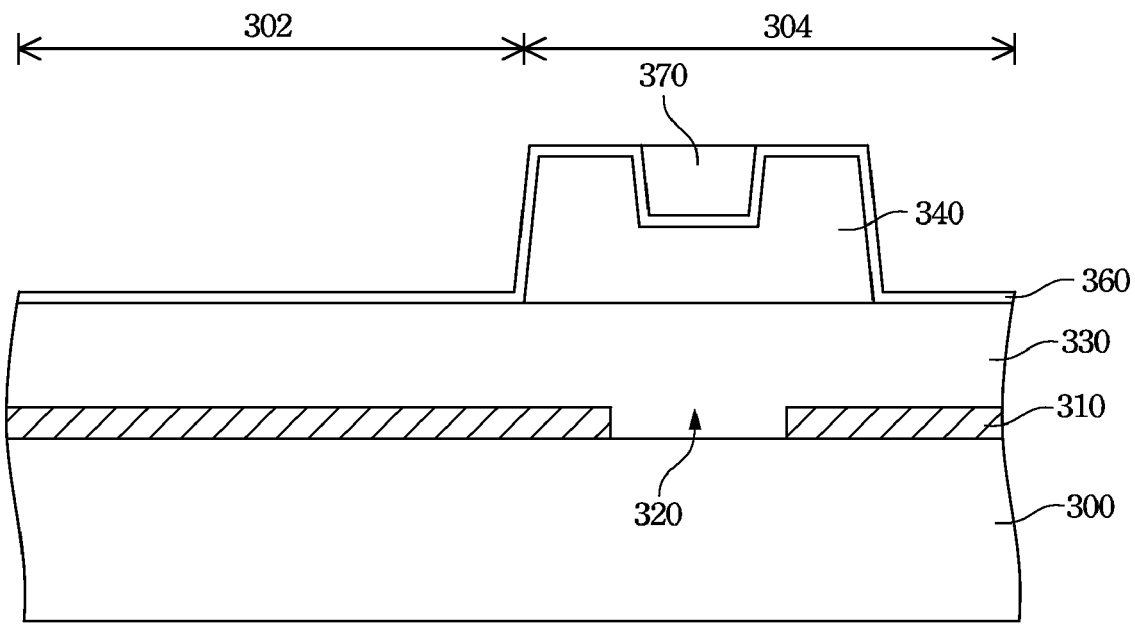

In FIG. 3C, a conformal transparent conductive layer 360 is formed on the first overcoat layer 330, the second overcoat layer 340, and the trench 350. A third overcoat layer 370 is then formed to fill the trench 350 to from a filled-up trench structure.

Figure 3D:
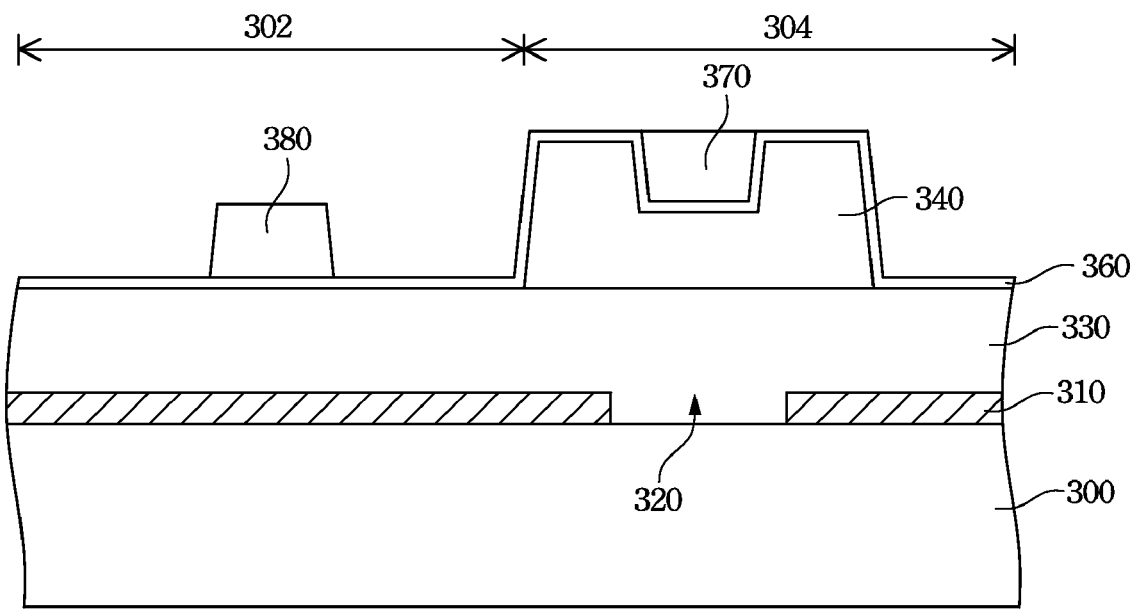
Figure 3E:
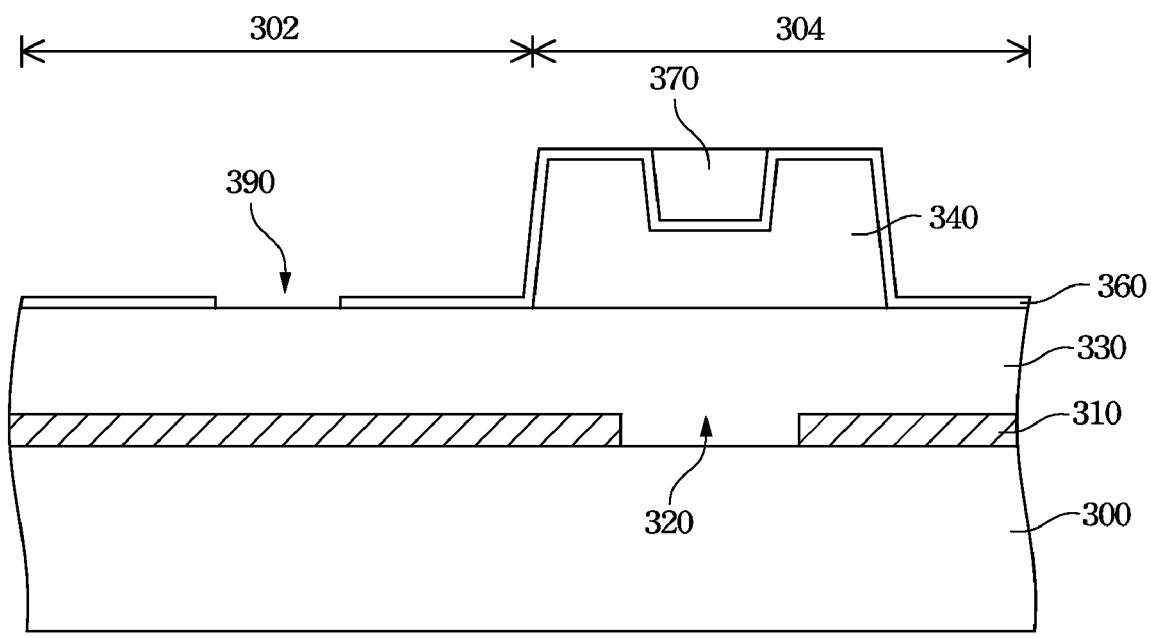

According to another embodiment, a protrusion can be additionally disposed in the transmission area to affect the alignment of liquid crystal molecules in this area. In FIG. 3D, a fourth overcoat layer is formed on the first overcoat layer 330 in the transmission area 302 to form a protrusion 380. The material of the protrusion 380 can be a transparent organic dielectric material, such as transparent photosensitive organic material PC403 of JSR Company.

According to yet another embodiment, a slit can be formed in the transmission area to decrease the problem of occurring disclination line. The transparent conductive layer 360 in FIG. 3C can be patterned to form slit 390 in the transmission area 304 in FIG. 3E.

Moreover, another light pervious opening (not shown in figure) can be further disposed in the first overcoat layer 330 of the above embodiments. The bottom of the light pervious opening in the first overcoat layer 330 touch the bottom of the light pervious opening 320 in the color filter layer 310. As a result, the light transmission rate of the light entering the LCD can be increased, since the light can directly entering the second overcoat layer 340 without the need of penetrating the first overcoat layer 330.

Embodiment 3

Filled-up Deep Trench Structure in Reflective Area

Figure 4:
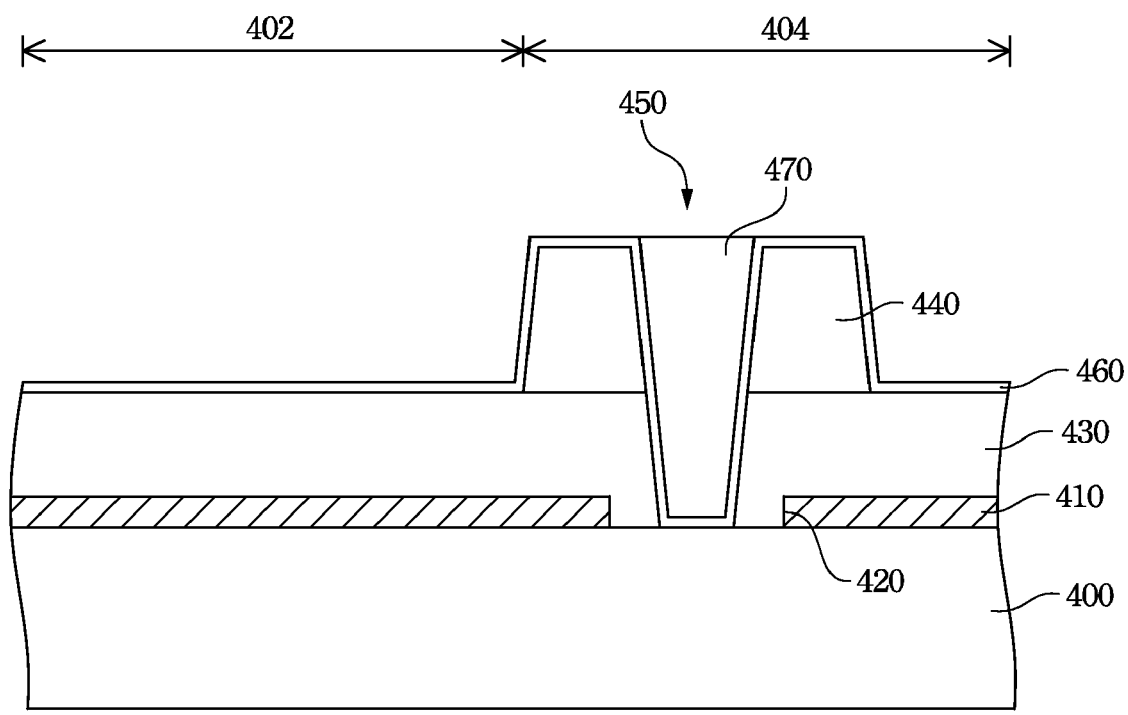
FIG. 4 is a cross-sectional diagram showing a color filter plate of a transreflective LCD according to an embodiment of this invention.

The reference numbers in FIG. 4 larger than the reference numbers in FIGS. 3A-3E by 100 represent the same elements in FIGS. 3A-3E.

In FIG. 4, the depth of the trench 350 in FIG. 3B is increased to form the deep trench 450 penetrating the second overcoat layer 440 and the first overcoat layer 430 to touch the bottom of the light pervious opening 420. The top view of the deep trench 450 can be any shapes, such as square or circle. Then, a conformal transparent conductive layer 460 is formed on the first overcoat layer 430, the second overcoat layer 440 and the deep trench 450. Finally, a third overcoat layer 470 is formed to fill the deep trench 450 to form a filled-up trench structure. Comparing with the structure shown in FIG. 3b, the deep trench 450 can increase the range of the tilt liquid crystal, and the filled-up effect is better.

Similarly, a protrusion, like the protrusion 380 in FIG. 3D, can be additionally disposed in the transmission area 402 to affect the alignment of liquid crystal molecules in the transmission area 402. Alternatively, a slit, like the slit 390 in FIG. 3E, can be additionally formed in the transmission area 402 to decrease the problem of occurring disclination line. Since the processes of fabricating the protrusion and the slit have been described above, the detail process steps are omitted here.

Besides, embodiments 1 and 2, or embodiments 1 and 3 can be combined to form the filled-up trench structures, rather then the protrusions, to twist the electrical field in the liquid crystal layer. Therefore, the tilt directions of the liquid crystal molecules can be varied to achieve the effect of multi-domain vertical alignment.

II. TFT Array Plate

Figure 5A:
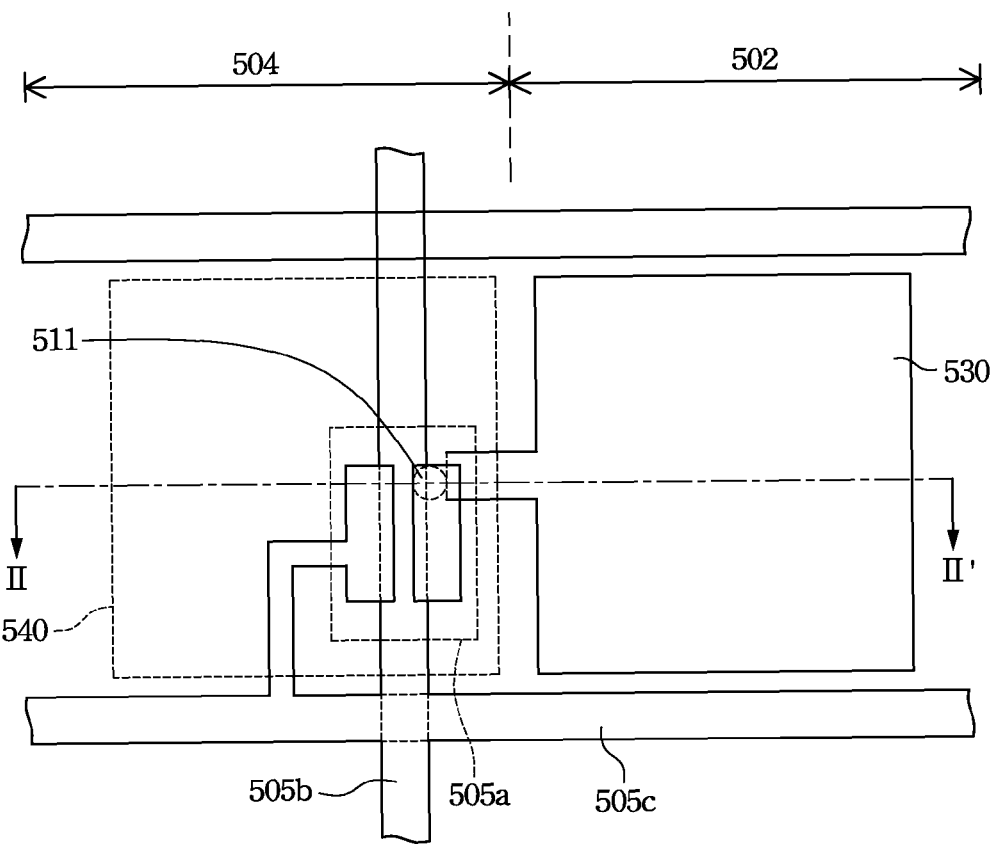
FIG. 5A is a vertical view showing a TFT (Thin Film Transistor) array plate of a transreflective LCD.
Figure 5B:
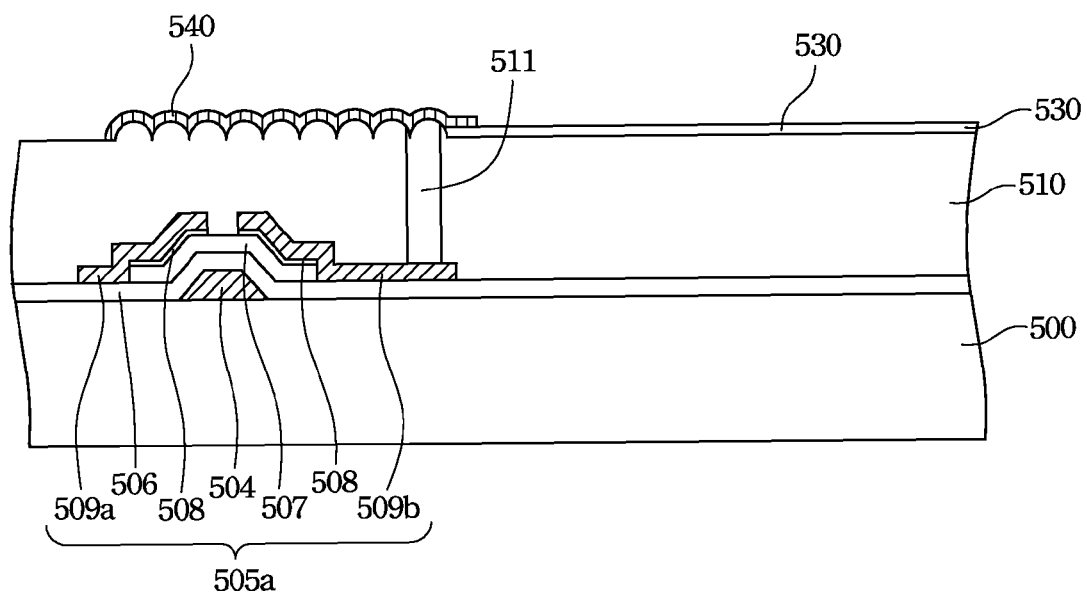
FIG. 5B is a cross-sectional diagram of cutting line II-II' in FIG. 5A.

FIG. 5A is a vertical view showing a TFT (Thin Film Transistor) array plate of a transreflective LCD, and FIG. 5B is a cross-sectional diagram of cutting line II-II' in FIG. 5A. FIGS. 5A and 5B show a pixel unit includes a transmission area 502 and a reflective area 504. In this pixel unit, a TFT array circuit is composed by a TFT 505a, a gate line 505b, and a data line 505c.

As shown in FIG. 5B, TFT 505a includes a gate 504, a gate dielectric layer 506, a semiconductor layer 507, two ohm contacts 508, a source 509a, and a drain 509b. The gate 504 disposed on the transparent substrate 500 electrically connects the gate line 505c. The gate dielectric layer 506 covers the gate 504. The semiconductor layer 507 locates on the gate dielectric layer 506 to serve as a channel of the TFT 505a. The two ohm contacts 508 locates on the semiconductor layer 507. The source 509a and the drain 509b respectively locate on the two ohm contacts 508.

In FIG. 5B, over the TFT 505a, there is a first overcoat layer 510, a metal reflective electrode 540 disposed on the first overcoat layer 510 in the reflective area 504, and a transparent conductive layer 530 in the transmission area 502. A conductive plug 511 is used to electrically connect the metal reflective electrode 540 and the drain 509b.

Filled-up trench structures on a TFT array plate are illustrated in the following embodiments 4-5 to show how to achieve multi-domain vertical alignment and decrease the light leakage in the dark state due to irregular alignment of liquid crystal molecules.

Embodiment 4

Filled-up Structure in the Reflective Area

FIGS. 6A-6D are cross-sectional diagrams showing a method of fabricating a TFT array plate of a transreflective LCD according to an embodiment of this invention.

Figure 6A:
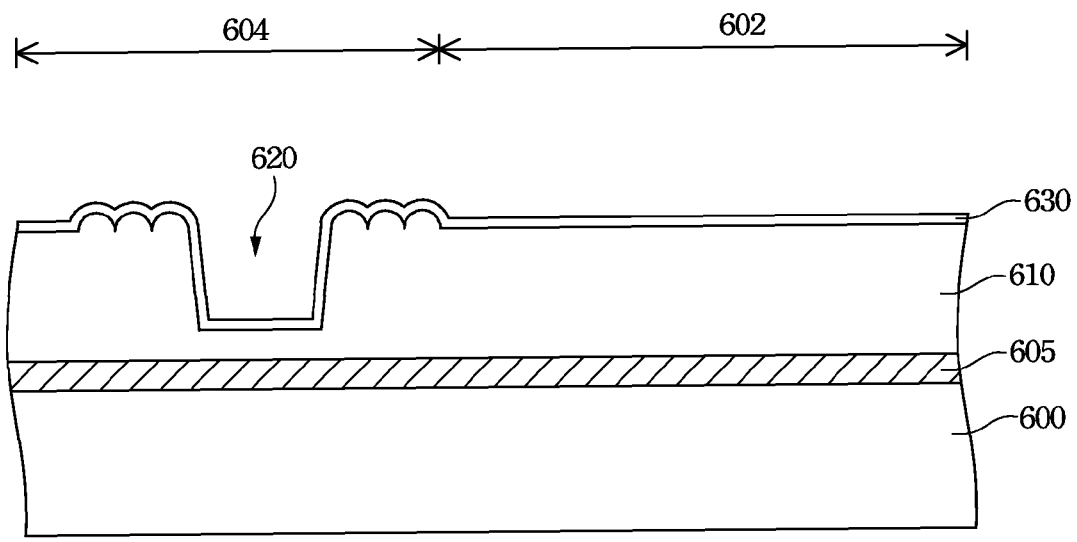
FIGS. 6A-6D are cross-sectional diagrams showing a method of fabricating a TFT array plate of a transreflective LCD according to an embodiment of this invention.

In FIG. 6A, a substrate having a transmission area 602 and a reflective area 604 is provided. A TFT array circuit 605 is formed on the transparent substrate 600, and the detail structure of the TFT array circuit 605 is omitted for the sake of simplicity. An overcoat layer 610 is formed on the transparent substrate 600 and has a trench 620 in the reflective area 604. The top view of the trench 620 can be any shapes, such as square or circle. A conformal transparent conductive layer 630 is formed on the first overcoat layer 610. It is well known that each of the TFT in the TFT array circuit 605 can be used as a switch.

Figure 6B:
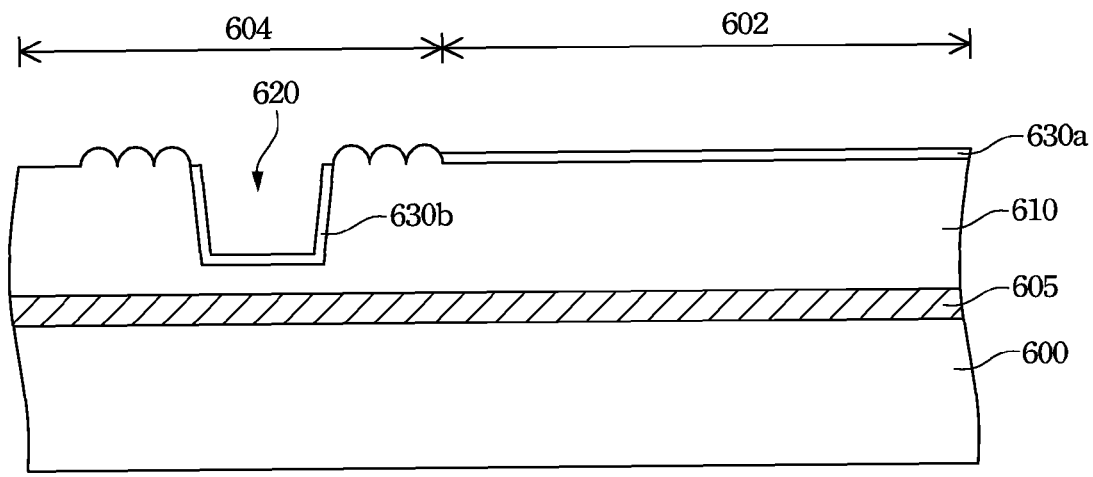

In FIG. 6B, the transparent conductive layer 630 is patterned to form a pixel electrode 630a in the transmission area 602 and a control electrode 630b in the trench 620.

Figure 6C:
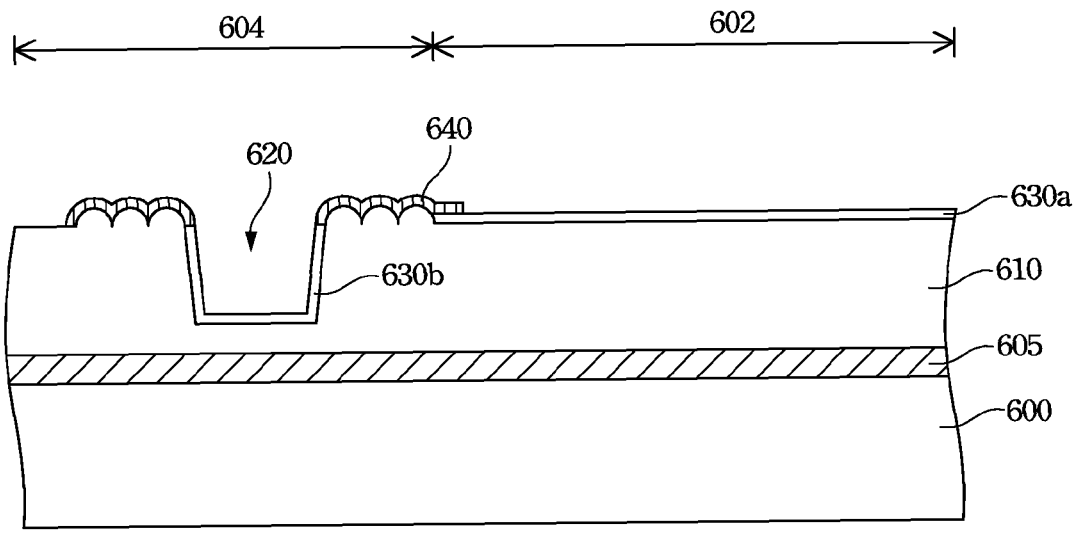

In FIG. 6C, a metal layer is formed on the first overcoat layer 610, the pixel electrode 630a, and the control electrode 630b. The metal layer is then patterned to form a metal reflective electrode 640 surrounding the trench 620 in the reflective area 604. And the metal reflective electrode 640 is electrically connected to the control electrode 630b and drain (not shown).

Figure 6D:
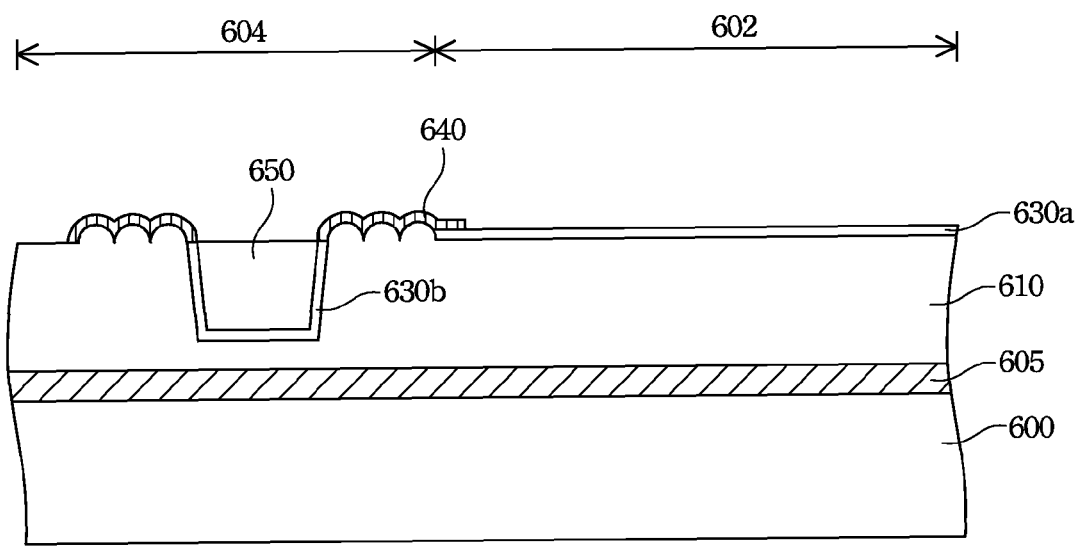

In FIG. 6D, a second overcoat layer 650 is formed to fill the trench 620 to form a filled-up trench structure in the reflective area 704.

Embodiment 5

Filled-up Trench Structure in the Reflective Area

Figure 7A:
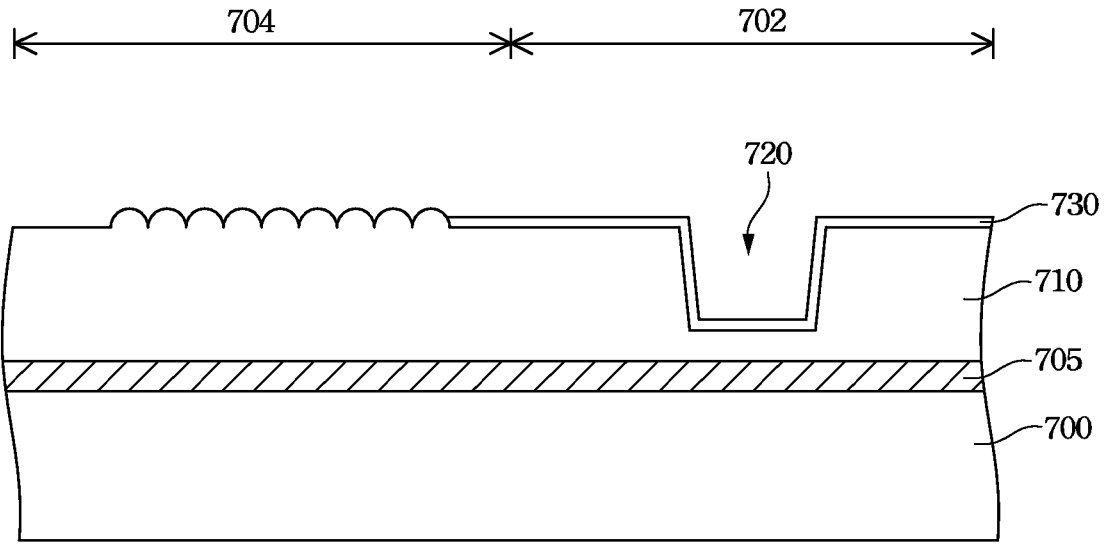
FIGS. 7A-7B are cross-sectional diagrams showing a method of fabricating a TFT array plate of a transreflective LCD according to an embodiment of this invention.
Figure 7B:
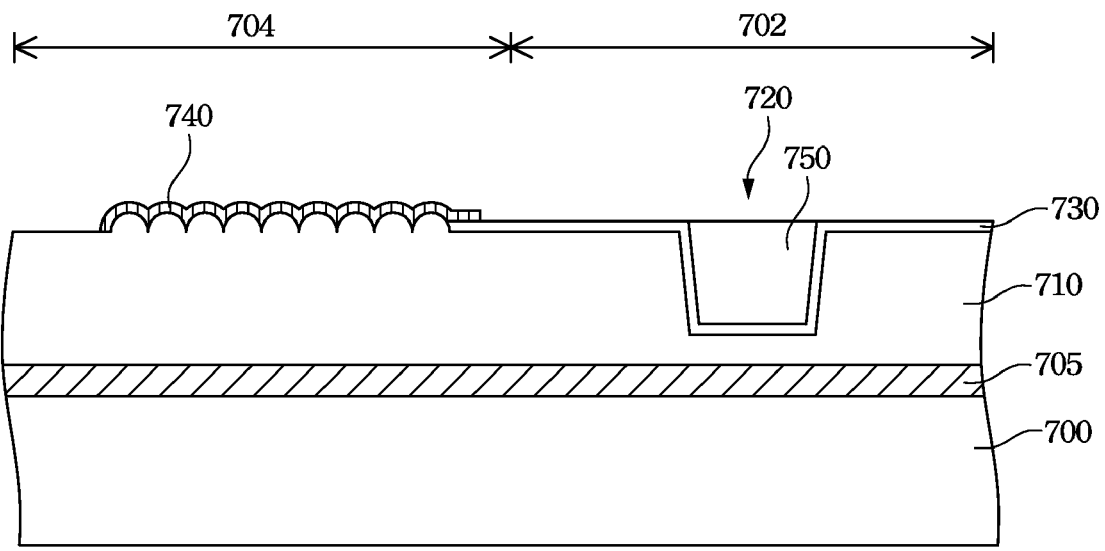

Similarly, the filled-up trench structure can also locate on the TFT array plate in the transmission area. FIGS. 7A-7B are cross-sectional diagrams showing a method of fabricating a TFT array plate of a transreflective LCD according to an embodiment of this invention.

In FIG. 7A, a substrate having a transmission area 702 and a reflective area 704 is provided. A TFT array circuit 705 is formed on the transparent substrate 700, and the detail structure of the TFT array circuit 705 is omitted for the sake of simplicity. An overcoat layer 710 is formed on the transparent substrate 700 and has a trench 720 in the transmission area 702. The top view of the trench 720 can be any shapes, such as square or circle. A conformal transparent conductive layer 730 is formed on the first overcoat layer 710 and then pat-terned to form a pixel electrode 730. It is well known that each of the TFT in the TFT array circuit 705 can be used as a switch.

In FIG. 7B, a metal layer is formed on the first overcoat layer 710 and the pixel electrode 730 and then patterned to form a metal reflective electrode 740, which is electrically connected to the pixel electrode 730 and drain (not shown). A second overcoat layer 750 is formed to fill the trench 720 to form a filled-up trench structure in the transmission area 702.

III. Examples of Assembling Structures

The structures of the color filter plate or the TFT array plate can be applied to any kinds of transreflective LCD.

Figure 8A:
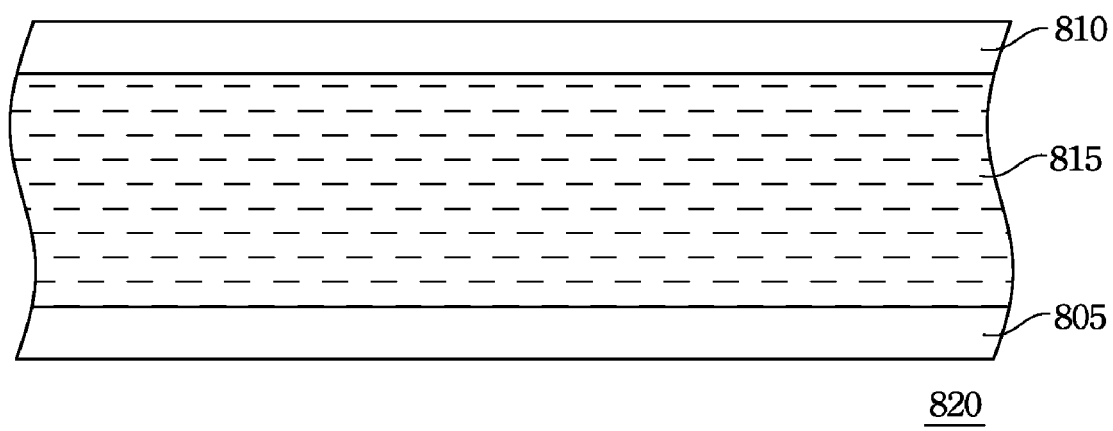
FIG. 8A is a cross-sectional diagram showing a LCD display.

FIG. 8A is a cross-sectional diagram showing a LCD display. In FIG. 8A, LCD 820 has a first substrate 810, a second substrate 805, and a liquid crystal layer 815 between the first substrate 810 and the second substrate 805. If a color filter is formed on the first substrate 810, the first substrate 810 is a color filter plate, and the second substrate 805 is a TFT array plate. However, the structure is not limited here. A color filter can be formed on the second substrate 805 to form a color filter plate, which is also a TFT array plate that has TFT array circuit thereon.

The filled-up trench structure of the color filter plate and the TFT array plate can be assembled in any possible way. For example, the filled-up trench structure can be disposed in the transmission area and/or the reflective area of the color filter plate and/or the TFT array plate.

Some assembling structures of the color filter plate and the TFT array plate are described below by examples. FIGS. 8B-8E are cross-sectional diagrams showing some assembling structures of the color filter plate and the TFT array plate of a transreflective LCD according to embodiments of this invention. Since the reference numbers in FIGS. 8B-8E have been appeared in FIGS. 2-7, the descriptions of the corresponding elements are omitted below.

Figure 8B:
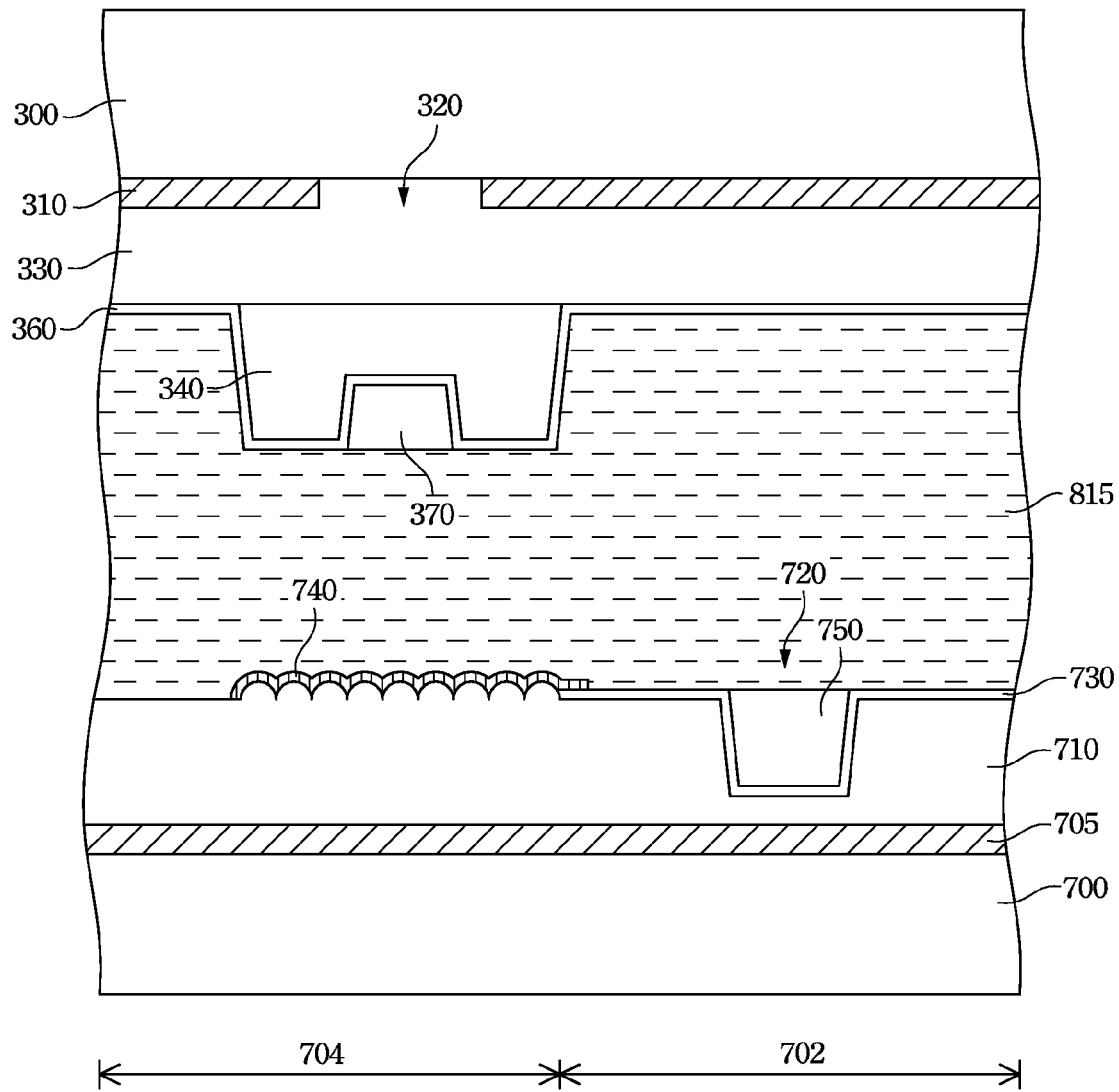
FIGS. 8B-8E are cross-sectional diagrams showing some assembling structures of the color filter plate and the TFT array plate of a transreflective LCD according to embodiments of this invention.

In FIG. 8B, a first filled-up structure is disposed in the reflective area of the color filter plate (as in FIG. 3C), and a second filled-up structure (as in FIG. 7B) is disposed in the transmission area of the TFT array plate.

Figure 8C:
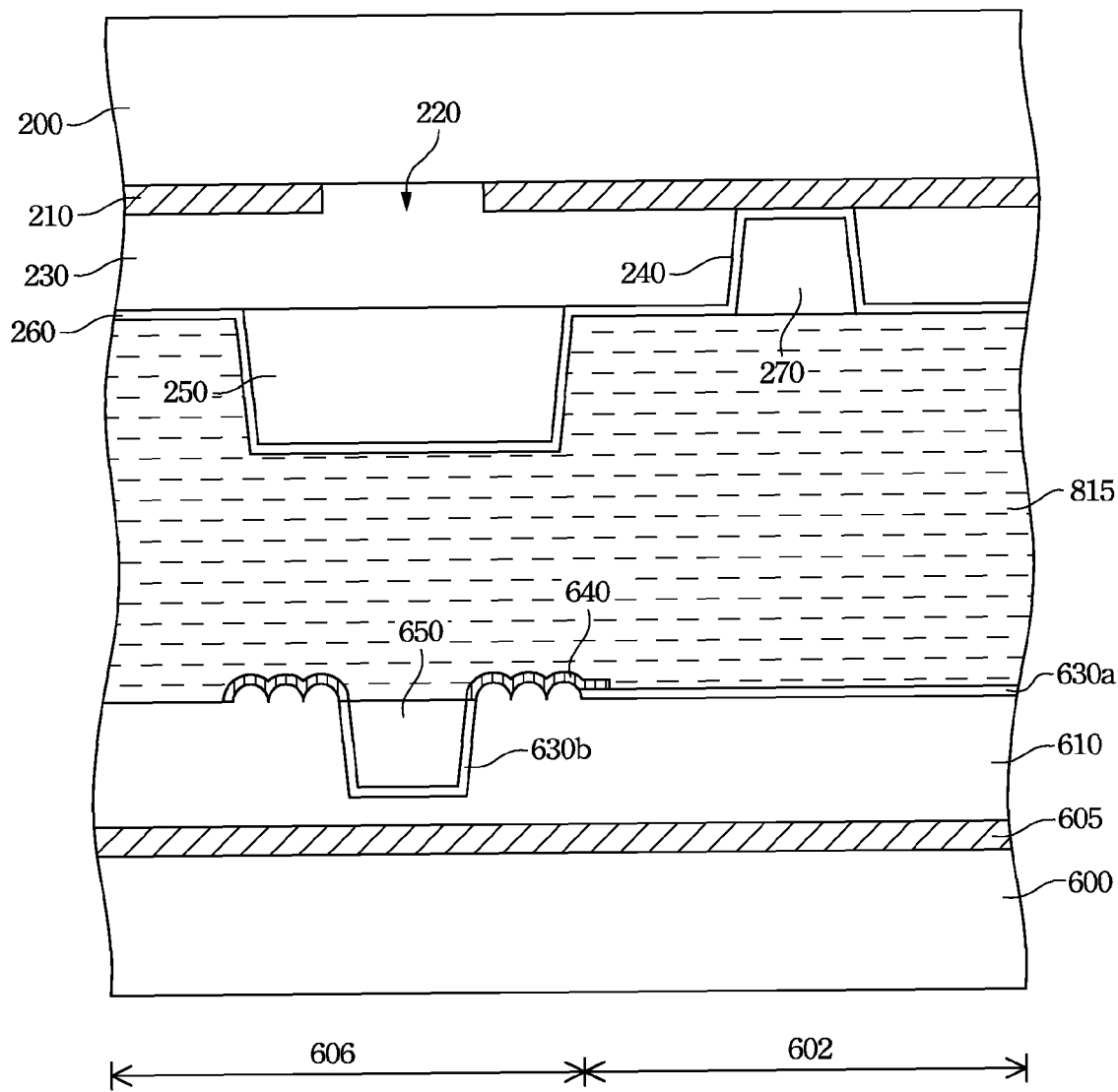

In FIG. 8C, a first filled-up structure is disposed in the transmission area of the color filter plate (as in FIG. 2C), and a second filled-up structure (as in FIG. 6D) is disposed in the reflective area of the TFT array plate.

Figure 8D:
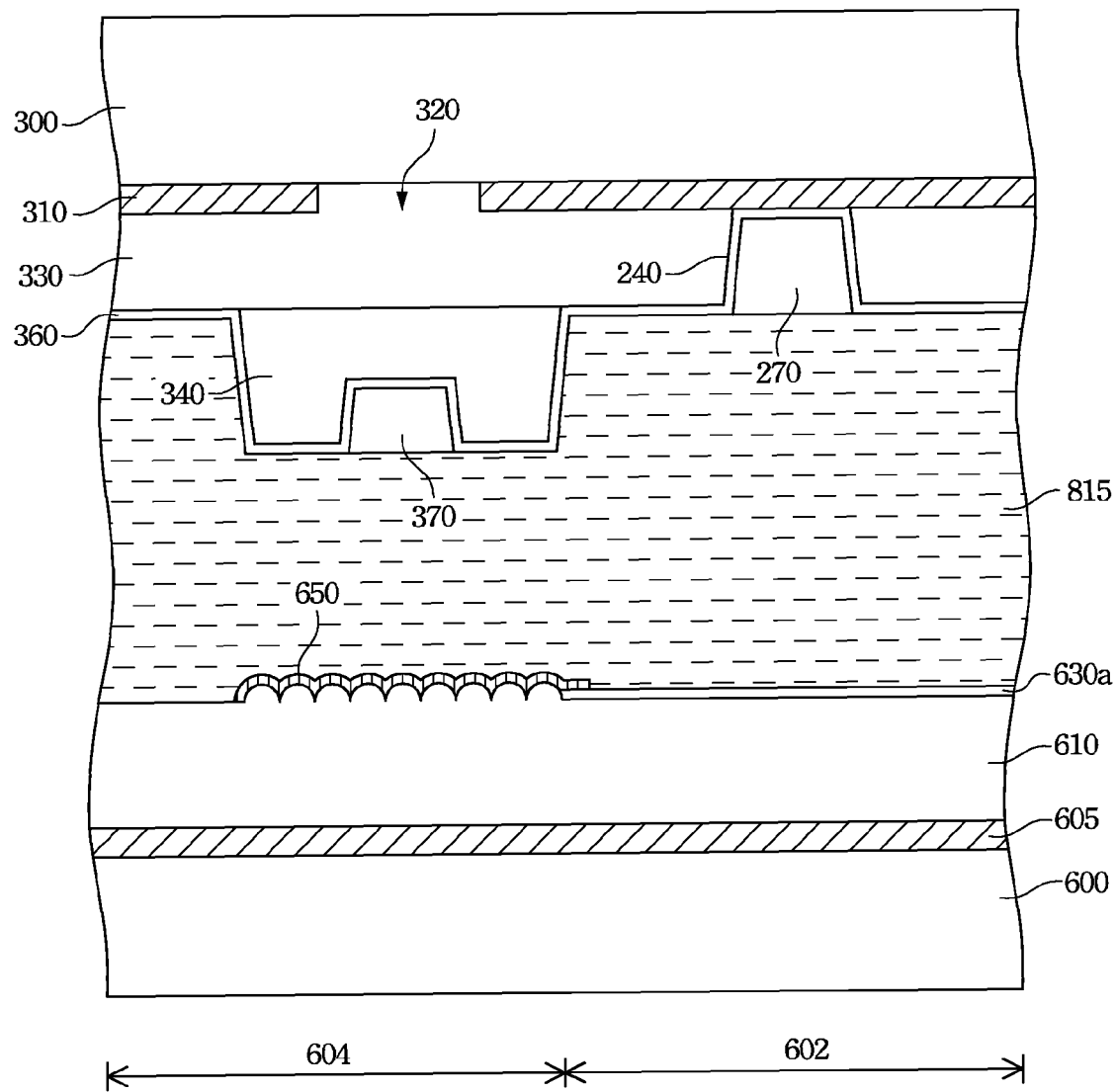
Figure 8E:
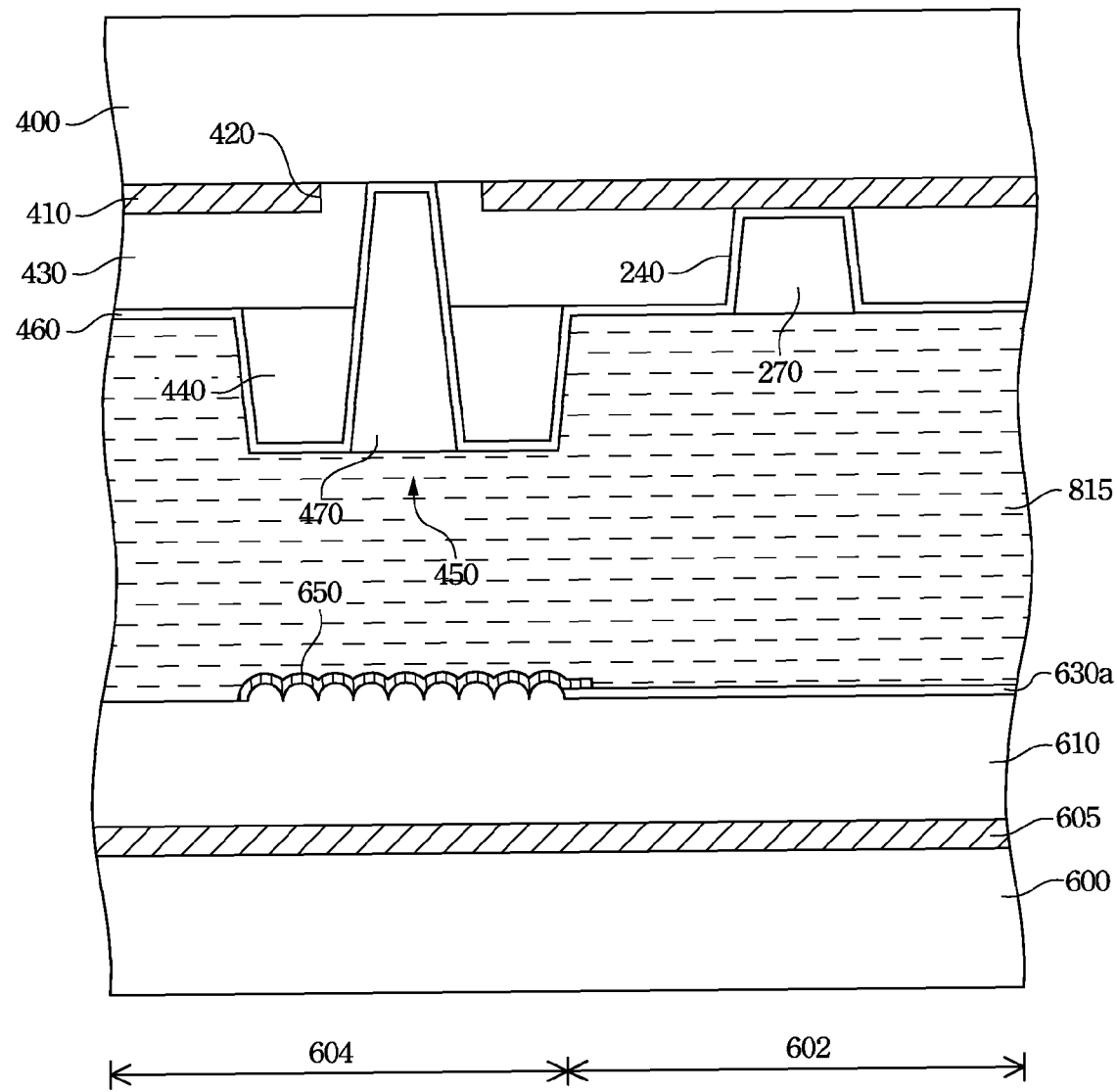

In FIGS. 8D and 8E, a first and a second filled-up structures are respectively disposed in the transmission area and the reflective area of a color filter plate, and no filled-up structure is disposed on the TFT array plate. In FIG. 8D, the filled-up trench structures in FIGS. 2C and 3C are combined. In FIG. 8E, the filled-up trench structures in FIGS. 2C and 4 are combined.

From the embodiments described above, a filled-up trench structure is formed by the following steps. A trench is formed in an overcoat layer either on a color filter plate or on a TFT array plate. A conformal transparent conductive layer is then formed on the inner surface of the trench. Another overcoat layer is formed to fill the trench to form the filled-up trench structure. Since the transparent conductive layer is conformal with the inner surface of the trench, the transparent conductive layer can twist the electrical field of the liquid crystal layer by applying a voltage. Additionally, the trench is filled up and has a planar surface, the alignment directions of the liquid crystal layer can be more regularly tilted according to the twisted electrical field generated by the transparent conductive layer. Therefore, an effect of multi-domain vertical alignment can be achieved, and the problem of the light leakage in the dark state due to irregular alignment of liquid crystal molecules can also be improved at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A transreflective liquid crystal display (LCD) comprising:
   a first substrate having a first transmission area and a first reflective area, a second substrate, and a liquid crystal layer therebetween, wherein the first substrate comprising:
   a first transparent substrate;
   a first overcoat layer on the first transparent substrate, wherein the first overcoat layer has a first trench in the first transmission area;
   a second overcoat layer on the first overcoat layer in the first reflective area;
   a transparent electrode conformably formed on the first over coat layer, the first trench, and the second overcoat layer; and
   a third overcoat layer filling the first trench.

2. The transreflective LCD of claim 1, wherein the material of the first, the second, and the third overcoat layers comprises an organic or an inorganic transparent dielectric material.

3. The transreflective LCD of claim 1, further comprising a color filter layer between the first transparent substrate and the first overcoat layer, wherein the color filter layer has a light pervious opening in the first reflective area.

4. The transreflective LCD of claim 3, wherein the first and the second overcoat layers have a second trench in the first reflective area and the bottom of the second trench touch the bottom of the light pervious opening, the transparent electrode conformably covers the second trench and the third overcoat layer fills the second trench.

5. The transreflective LCD of claim 4, wherein the second substrate having a second transmission area and a second reflective area comprises:
   a second transparent substrate;
   a switch device on the second transparent substrate;
   a fourth overcoat layer covering the switch device on the second transparent substrate;
   a transparent pixel electrode on the fourth overcoat layer in the second transmission area; and
   a reflective pixel electrode on the fourth overcoat layer in the second reflective area.

6. The transreflective LCD of claim 1, further comprising a protrusion on the transparent electrode and the second overcoat layer in the first reflective area.

7. The transreflective LCD of claim 1, wherein the transparent electrode has a slit on the second overcoat layer in the first reflective area.

8. The transreflective LCD of claim 1, wherein the second overcoat layer has a second trench in the first reflective area, the transparent electrode conformably covers the second trench, and the third overcoat layer fills the second trench.

9. The transreflective LCD of claim 8, wherein the second substrate, having a second transmission area and a second reflective area, comprises:
   a second transparent substrate;
   a switch device on the second transparent substrate;
   a fourth overcoat layer covering the switch device on the second transparent substrate;
   a transparent pixel electrode on the fourth overcoat layer in the second transmission area; and
   a reflective pixel electrode on the fourth overcoat layer in the second reflective area.

10. The transreflective LCD of claim 1, wherein the second substrate, having a second transmission area and a second reflective area, comprises:
    a second transparent substrate;
    a switch device on the second transparent substrate;
    a fourth overcoat layer covering the switch device on the second transparent substrate, wherein the fourth overcoat layer has a third trench in the second reflective area;
    a transparent pixel electrode on the fourth overcoat layer in the second transmission area;
    a transparent control electrode on the inner surface of the third trench;
    a fifth overcoat layer fills the third trench; and
    a reflective pixel electrode on the fourth overcoat layer in the second reflective area.

11. A transreflective liquid crystal display (LCD) comprising:
    a first substrate having a first transmission area and a first reflective area, a second substrate having a switch device, and a liquid crystal layer therebetween, wherein the first substrate comprising:
    a first transparent substrate;
    a first overcoat layer on the first transparent substrate;
    a second overcoat layer on the first overcoat layer in the first reflective area, wherein the second overcoat layer has a trench;
    a transparent electrode conformably covering the first over coat layer, the second overcoat layer, and the trench; and
    a third overcoat layer filling the trench.

12. The transreflective LCD of claim 11, wherein the material of the first, the second, and the third overcoat layers comprises an organic or an inorganic transparent dielectric material.

13. The transreflective LCD of claim 11, further comprising a color filter layer between the first transparent substrate and the first overcoat layer, wherein the color filter layer has a first light pervious opening in the first reflective area.

14. The transreflective LCD of claim 11, further comprising a protrusion on the transparent electrode in the first transmission area.

15. The transreflective LCD of claim 11, wherein the transparent electrode has a slit on the second overcoat layer in the first transmission area.

16. The transreflective LCD of claim 11, wherein the second substrate having a second transmission area and a second reflective area comprises:
    a second transparent substrate;
    a switch device on the second transparent substrate;
    a fourth overcoat layer covering the switch device on the second transparent substrate, wherein the fourth overcoat layer has a fourth trench in the second transmission area;
    a transparent pixel electrode on the fourth overcoat layer on the second transmission area;
    a fifth overcoat layer filling the fourth trench; and
    a reflective pixel electrode on the fourth overcoat layer in the second reflective area.

* * * * *